Patented June 2, 1953

2,640,857

UNITED STATES PATENT OFFICE 2,640,857

CHLORINATED POLYMERS OF BRANCHED CHAIN 1,3-HEXADIENES

John L. Van Winkle, San Lorenzo, and Rupert C. Morris, Berkeley, Calif., assignors to Shell Development Company, San Francisco, Calif., a corporation of Delaware No Drawing. Application August 13, 1948, Serial No. 44,237

1 Claim. (Cl. 260—648)

This invention relates to the provision of novel compositions obtained by halogenating low molecular weight unsaturated cyclic polymers of branched chain 1,3-hexadienes. This application is a continuation-in-part of our copending application Serial No. 562,744, filed November 9, 1944, now abandoned.

We have discovered that the novel composition obtained through halogenation of compounds which are low molecular weight unsaturated cyclic polymers of branched chain 1,3-hexadienes having in the molecule a straight chain of five carbon atoms, are particularly useful compounds possessing a wide variety of unusual and unexpected properties. These halogenated polymer products exhibit a high degree of compatibility in a wide variety of high molecular weight compounds and are effective plasticizers for the latter. In contrast, halogenated paraffinic wax and other similar halogenated aliphatic hydrocarbons which have been suggested as modifiers are of limited usefulness because of their incomplete compatibility with many high molecular weight compounds such as cellulose derivatives, vinyl polymers, synthetic rubbers and with many mineral oil compositions, in all of which the novel compounds of the present invention are highly compatible. In addition, the compounds of this invention possess other useful properties, including those of a dielectric nature, as will be brought out in subsequent portions of this description.

These new halogenated compounds may be obtained by the addition of a halogen to a low molecular weight, unsaturated cyclic polymer of a branched chain 1,3-hexadiene having in the molecule a straight chain of five carbon atoms, or to a mixture of such polymers. The low molecular weight polymers here referred to are described in detail in U. S. Patent 2,429,582, issued October 21, 1947, to which reference is made for a complete disclosure on the score of the polymers and methods for their preparation. One method of preparing these polymers which is described in said patent is to polymerize a branched chain 1,3-hexadiene having a straight chain of five carbon atoms in the molecule in the presence of sulfur dioxide and of either oxygen or an oxygen-yielding compound as a catalyst. The polymerization is preferably conducted at elevated temperatures, as 80° C. or above, and with a mixture of hexadienes, as 2-methyl-1,3-pentadiene and 4-methyl-1,3-pentadiene. Air is a suitable source of molecular oxygen, though preferred oxygen-yielding catalysts for this purpose are peroxides such as benzoyl peroxide, tertiary butyl hydroperoxide, acetyl peroxide, benzoyl acetyl peroxide, lauroyl peroxide and di(tertiary butyl)-peroxide. An appreciable yield of polymers may be obtained even when only traces of peroxide are present. Amounts as small as five milli-equivalents of active oxygen per liter of liquid hexadiene may be sufficient, though improved yields are obtained through the use of from 10 to 100 milli-equivalents of active oxygen per liter of liquid hexadiene. The amount of sulfur dioxide employed may be varied over a wide range, though it is preferred to use at least one mole of this compound per mole of hexadiene reactant.

Another way of preparing the low molecular weight polymers which is disclosed in U. S. Patent No. 2,429,582 involves the thermal cracking of one or more dimethylsulfolenes. The latter compounds are cyclic monosulfones which are obtainable by reacting in the liquid phase one or more of the aforedesignated branched chain hexadienes (preferably peroxide free) with sulfur dioxide in the substantial absence of molecular oxygen or any oxygen-yielding compound, the reaction being conducted at elevated temperatures below the decomposition temperature of the mono-sulfones formed during the reaction. Temperatures in the neighborhood of 100° are generally suitable. This method of preparing cyclic mono-sulfones is disclosed in U. S. Patent No. 2,420,834, issued May 20, 1947, to which reference is here made. Suitable cyclic mono-sulfones which may be cracked to produce the low molecular weight polymers are 2,2-dimethyl-3-sulfolene, 2,4-dimethyl-3-sulfolene and 2,5-dimethyl-3-sulfolene.

As is pointed out in the patents referred to above, the term "sulfolene" refers to an unsaturated structure containing four carbon atoms and a sulfur atom in a ring, there being a single olefinic linkage between any two adjoining carbon atoms, and the sulfur atom having two oxygen atoms attached thereto. This compound has also been called "thiacyclopenten-1,1-dioxide." The double bond in the sulfolenes may be between any two of the adjacent carbon atoms of the ring, the generic term "sulfolene" covering both the simple, unsubstituted sulfolenes, i. e., 3-sulfolene having the structure:

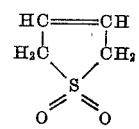

and 2-sulfolene having the structure:

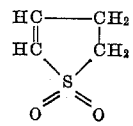

as well as the various derivatives thereof, i. e., sulfolenes in which various radicals are substituted for one or more of the hydrogen atoms of the above structures.

The numbering system of the sulfolene ring (and of the corresponding saturated sulfolane ring) is indicated below:

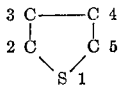

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84.

Thermal cracking of the dimethylsulfolenes to produce the low molecular weight polymers which are halogenated in accordance with this invention may be effected under a wide range of conditions. A simple procedure comprises merely heating the compounds under a reflux condenser, the rate of cracking being so controlled by the temperature employed that the evolved sulfur dioxide does not sweep away the reactant or other products. Inert diluents need not be employed, although they may be present, if desired. Cracking is preferably effected in the presence of oxygen and/or peroxides, although it may also be effected in their absence. In the presence of air and under atmospheric pressure, cracking ordinarily begins to occur at a significant rate at about 80° C. Rapid decomposition of the dimethylsulfolenes occurs in the neighborhood of 100° C. The temperature is ordinarily raised gradually as the reaction progresses. Temperatures up to about 200° C. may be employed. If desired, the process may be carried out in a continuous manner. Superatmospheric or reduced pressures may be employed. However, reduced pressures favor the production of the original monomers at the expense of the polymers. The sulfur dioxide obtained as a by-product may be discarded or recovered and recycled. In most cases a small amount of monomeric hexadienes is formed as a by-product. These may be removed from the reaction mixture by distillation, preferably by flash distillation, or other methods.

The crude product obtained either from the designated monomeric hexadienes by polymerization in the presence of sulfur dioxide and of oxygen or oxygen-yielding substances, or by the cracking of dimethylsulfolenes, is a brown, viscous liquid consisting principally of a mixture of low molecular polymers of the hexadienes. It may contain a very small amount (a trace) of sulfur-containing impurities and of unreacted hexadienes. These impurities can be removed and a stable, more uniform product obtained simply by maintaining the polymers at an elevated temperature, desirably 200° C. to 225° C., preferably under atmospheric or reduced pressures. Heating for 2 to 4 hours is ordinarily satisfactory, although shorter or longer periods may be employed. The purified mixture of polymers gives a negative test for sulfur and sulfur-containing compounds. The pure or crude mixture of polymers may be separated into several fractions by distillation, preferably under reduced pressures, or by other methods such as solvent extraction, etc. Fractions boiling below about 380° C. under atmospheric pressures consist principally of dimers, trimers and tetramers (which contain cyclic structures) of the hexadienes. Approximately 52% of the polymeric substance boils above about 380° C. under atmospheric pressures and consists essentially of a mixture of polymers the average or apparent molecular weight of which is substantially equal to that of a seven-unit polymer (having a polymerization degree of about seven) containing in the molecule the structure:

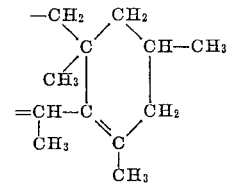

This higher molecular weight fraction is obtained as a yellow, highly viscous and sticky liquid which is soluble in hydrocarbons.

For most purposes the mixture of polymers need not be fractionated but may be employed as such in forming the halogenated compounds of this invention. If desired, however, any fraction or combination of fractions may be used in place of the whole mixture.

The halogenation of these low molecular weight cyclic polymers may be effected in any suitable manner. Where the polymers are reacted with chlorine, a simple and preferred method comprises bubbling chlorine gas through a liquid mixture of the polymers, preferably under constant stirring or other method of agitation, until a product having the desired chlorine content is obtained.

Temperatures of from about 0° C. to about 150° C. are preferred, although in some cases somewhat lower or higher temperatures may be found suitable. For the production of compounds containing not more than about 40% by weight of chlorine, temperatures within the range of from about 0° C. to about 50° C. are ordinarily preferred. To obtain products having a higher chlorine content it may be desirable to use temperatures between about 50° C. and about 150° C. If desired, chlorination in the lower temperature range may be followed by use of higher temperatures or vice versa. While atmospheric pressures are satisfactory, superatmospheric pressures may be employed in the chlorination process, if desired. Pressures sufficient to maintain the chlorine in liquid phase may be used. The process may be carried out in a continuous or batchwise manner.

Catalysts such as metallic halides, particularly the chlorides of metals, e. g. ferric chloride, aluminum chloride, stannic chloride, etc. may be employed in small amounts to hasten halogenation. Likewise, ultraviolet light has a catalytic effect.

Halogenation may be effected in the presence or absence of an homogenizing agent. Preferred homogenizing agents are inert (non-reactive under the conditions employed) liquid solvents for the polymer reactants and, preferably, also for the products. Such homogenizing agents serve to reduce the viscosity of the reaction mixture, promote the reaction by bringing the reactants into more intimate contact, and act as heat-transfer media. Examples of some of the most useful homogenizing agents are chlorinated aliphatic and aromatic hydrocarbons such as methyl chloride, carbon tetrachloride, chloroform, methylene dichloride, etc. Chlorinated ethers are suitable, e. g. beta, beta'-dichlorodiethyl ether. For use in the lower temperature range, unhalogenated hydrocarbons, both aliphatic and aromatic, are satisfactory. Any other suitable solvents may be employed.

The time required for halogenation of the designated cyclic polymers is dependent upon numerous factors, particularly upon the temperatures and pressure employed and the concentration of halogenating agent present in the reaction mixture. In some cases products having a chlorine content as high as about 25% may be obtained in one hour under atmospheric pressure and at temperatures between about 15° C. and 30° C. In general, reaction periods ranging from about 10 minutes to about 4 to 5 hours may be required.

The reaction should ordinarily be carried out in contact with equipment which is substantially inert to the halogen employed and to the corresponding hydrohalide. Glass-lined metal vessels are generally suitable. Chlorination may be effected in the presence of noble metals and of many corrosion-resistant alloys, including iron-nickel-molybdenum alloys.

Instead of using chlorine as a halogenating agent, bromine, iodine or fluorine may be employed, the properties of the products being somewhat different in each case. Halogenation with chlorine is preferred. Instead of using an elemental halogen there may be employed any compound capable of liberating the elemental halogen under the reaction conditions involved. Whatever the conditions under which halogenation of the low molecular weight hexadiene polymers is effected, the reaction is principally one of halo-substitution, the only halo-addition being at the unsaturated double bonds. Accordingly, changing the reaction temperature, for example, while altering the rate or extent of the halo-substitution reaction, does not affect the nature of the final product except as it may influence the extent of halo-substitution in a given time interval. Thus, under given reaction conditions a given low molecular weight hexadiene polymer or mixture of polymers may be halogenated to the extent of 15% by weight in ½ hour at reaction temperatures of from 15° C. to 30° C., whereas the same amount of halogen may be introduced in a much shorter time, e. g. 10 minutes, at reaction temperatures of from 75° C. to 100° C. In either event, the nature of the resultant reaction products is essentially the same.

Following the reaction, the halogenated polymers may be separated from the other ingredients of the reaction mixture and purified in any suitable manner. Unreacted halogen, if any, may be removed by volatilization or the like. Homogenizing agents, if any, may be separated by distillation, preferably under reduced pressure, by solvent extraction or the like.

The products of the invention are halogenated low molecular weight cyclic polymers of branch-chain 1,3-hexadienes having in the molecule a straight chain of 5 carbon atoms. The polymerization degree (the number of monomer units combined in the polymer molecule) appears to be substantially the same as in the unhalogenated polymers. The products usually contain a small amount of residual unsaturation, although the amount is substantially less than that of the unhalogenated polymer. The products are generally water-white or completely colorless. In the absence of solvents they are ordinarily somewhat more viscous than the unhalogenated polymers and range from easily pourable liquids to waxy solids, depending upon the average molecular weight and the extent of halogenation. Solutions of the halogenated polymers are ordinarily somewhat less viscuos than those of the corresponding unhalogenated polymers.

Halogenated cyclic polymers containing as little as about 1% of combined halogen may be found to exhibit valuable properties not found in the unhalogenated compounds. Preferably, however, the halogenated polymer contains at least 10% by weight of the halogen, particularly for use in admixture with aliphatic hydrocarbons. For many other purposes polymers containing larger amounts of combined halogen are more suitable. Polymers containing above about 50% by weight combined halogen ordinarily can be caused to burn, but will not support combustion, and are preferred where fire-resistance is important.

The halogenated polymers of this invention are extremely valuable compounds. They may be employed as plasticizers and as tackifiers for plastics and elastics of many kinds. Typical elastics with which they may be employed include rubber-like compositions containing natural rubber, reclaimed rubber, synthetic rubber, or mixtures of these with one another and with other substances. Examples of synthetic rubbers are the rubbery polymers and copolymers of 1,3-butadiene, the conjugated pentadienes and the conjugated hexadienes such as 2-methyl-1,3-pentadiene and 4-methyl-1,3-pentadiene, etc. Compounds which may be copolymerized with these and other dienes include styrene, dichlorostyrene, alpha-methylstyrene, acrylonitrile, methacrylonitrile, methyl methacrylate, methyl vinyl ketone, etc. Also representative of synthetic rubbers are copolymers of 1,3-butadiene with styrene and of 1,3-butadiene with acrylonitrile.

The halogenated cyclic polymers are effective plasticizers for synthetic resins and other plastics, such as casein and other protein plastics, lignin plastics, cellulose derivatives, synthetic linear polyamides, synthetic linear polyesters, phenol-aldehyde type resins, urea-aldehyde type resins, alkyd resins, resinous polymers of compounds having in the molecule one or more unsaturated carbon-to-carbon linkages, etc.

The halogenated cyclic polymers may be used as electrical insulating oils in transformers, condensers and other electrical equipment. Other kinds of insulation may be produced by impregnating paper, fabric or the like with compositions containing the halogenated cyclic polymers.

The following examples illustrate some of the many ways in which the invention may be carried out. Parts are on a weight basis.

*Example I*

In this operation, 2,4-dimethyl-3-sulfolene, 904 parts, was placed in a glass reaction kettle under a water-cooled reflux condenser open to the atmosphere and heated slowly. When the kettle temperature reached 87° C. decomposition of the sulfone was evident. The temperature was thereafter regulated to provide for the decomposition of the sulfone at such a rate that the sulfur dioxide evolved did not sweep any of the reactant or other products out of the kettle. Evolved sulfur dioxide was discarded. At the end of three hours when the decomposition was substantially complete the temperature had reached 151° C. Heating was continued for an additional four hours, the temperature being raised gradually to 191° C. The residue of 494 parts was a crude mixture of low molecular weight cyclic polymers containing 0.06% of sulfur. The polymer was stabilized and purified by heating in an open vessel exposed to the air at 200° C. to 225° C. for four hours. No sulfur could be detected in the purified polymer.

A solution of 200 parts of the purified mixture of cyclic polymers dissolved in 313 parts of carbon tetrachloride was placed in a glass kettle and cooled to below 30° C. Chlorine gas was bubbled through the solution while the temperature of the reaction mixture was held between 13.6° C. and 30° C. At the end of about half an hour 23 g. of chlorine had been added and further introduction of chlorine was stopped. The carbon tetrachloride was removed by distillation to 100° C. at 5 to 10 mm. pressure. The product contained 10.2% by weight of combined chlorine. The product was stabilized by the addition of one part of a mixture of aliphatic amines of 16 to 18 carbon atoms per 100 parts of the product. The stabilized chlorinated polymer was an almost colorless viscous liquid.

Example II

A solution of 1000 parts of a purified mixture of cyclic low molecular weight polymers, produced by the cracking of dimethyl sulfolene as described above in Example I, dissolved in 940 parts of carbon tetrachloride was chlorinated at between 10° C. and 30° C. in accordance with the procedure described in the foregoing example until 143 parts of chlorine had been added. The carbon tetrachloride was then flashed off in the usual manner yielding a product containing 12.1% of chlorine which was easily soluble in benzene and slightly soluble in hot acid octanes.

Example III

A chlorinated product having properties substantially identical with those of the chlorinated composition described in Example I may be prepared while following the same conditions described in that example except that here the chlorination reaction temperature is maintained between 75° C. and 100° C. and the period of that reaction is reduced to approximately 10 minutes.

Example IV

Again following the procedure employed in Example I, but continuing the chlorination beyond one-half hour, a mixture of chlorinated low molecular weight cyclic polymers having a chlorine content of 24.1% was produced. The mixture was somewhat dark in color and did not flow at room temperatures. It was easily soluble in benzene and very slightly soluble in hot acid octanes.

Example V

A steel kettle was charged with 957 parts of a mixture of 2-methyl-1,3-pentadiene and 4-methyl-1,3-pentadiene (about 85% of the former and about 15% of the latter, the mixture being obtained by the dehydration of 2-methyl-2,4-pentanediol) containing about 25 milli-equivalents of active oxygen per liter of the mixture at room temperature, and also containing 3,147 parts of sulfur dioxide. The kettle was sealed and maintained at about 100° C. for four hours. It was then cooled. The contents of the kettle were removed and warmed in a vessel exposed to the atmosphere to volatilize remaining unreacted sulfur dioxide. The liquid residue separated into two layers. The upper layer, 271 parts, consisted of a mixture of low molecular weight polymers of the dienes. The lower layer, 886 parts, consisted principally of dimethylsulfolenes. The mixture of polymers (separated from the dimethylsulfolenes) had a viscosity of 64.4 and 7.00 centistokes at 100° F. and 212° F., respectively. The average molecular weight (ebullioscopic in benzene) was about 610.

This polymer mixture was then subjected to fractional distillation under atmospheric pressures. 29.6% of the mixture was removed at below 305° C.; the residue had a viscosity of 1,149 centistokes at 100° F. 47.8% of the mixture was removed at below 380° C.; the residue had a viscosity of 4,242 centistokes at 100° F. and was a yellow, very viscous, sticky liquid, soluble in hydrocarbons and many other organic solvents. The latter liquid (being the polymer fraction boiling above 380° C.), preferably dissolved in carbon tetrachloride, is readily chlorinated by passing chlorine gas through the solution in the manner described in Example I. Upon distilling off the carbon tetrachloride solvent, the reaction product containing somewhat more than 10% chlorine may then be recovered as a light colored material, of semi-solid consistency at room temperatures, which is soluble in hydrocarbons, including benzene, as well as in other organic solvents.

The invention claimed is:

A composition boiling above about 100° C. at 10 mm. Hg pressure, which composition is obtained by reacting chlorine with a mixture of liquid, low molecular weight, unsaturated, cyclic polymers in solution in an inert solvent at a temperature between about 0° C. and 150° C. until the resulting chlorinated polymer composition has a chlorine content of at least 10% by weight, said polymeric reactant being a fraction boiling above 380° C. of a composition selected from the group consisting of (A) compositions obtained by heating a dimethylsulfolene at temperatures between about 80° C. and 200° C. in the presence of a member of the group consisting of molecular oxygen and peroxides and (B) compositions obtained by heating at least one methylpentadiene at temperatures between about 80° C. and 200° C. in the presence of sulfur dioxide and a member of the group consisting of molecular oxygen and peroxides.

JOHN L. VAN WINKLE.
RUPERT C. MORRIS.

References Cited in the file of this patent

UNITED STATES PATENTS

| Number | Name | Date |
| --- | --- | --- |
| 1,950,441 | Carothers et al. | Mar. 13, 1934 |
| 2,005,320 | Konrad et al. | June 18, 1935 |
| 2,276,203 | Kharasch | Mar. 10, 1942 |

OTHER REFERENCES

Ellis, "Chemistry of Petroleum Derivatives," vol. 1, pages 744, 748-53 (1934).

Backer et al., "Rec. Trav. Chim.," vol. 58, pages 778-84 (1939).

Bachman, "Jour. Am. Chem. Soc.," vol. 64, pages 787-90 (1942); vol. 66, pages 1513-14 (1944).